United States Patent
David (10) Patent No.: US 11,993,207 B2
(45) Date of Patent: May 28, 2024

(54) STEERING WHEEL ASSEMBLIES HAVING TACTILE FEEDBACK DEVICES

(71) Applicant: Toyota Motor Engineering & Manufacturing North America, Inc., Plano, TX (US)

(72) Inventor: Mikio David, Ypsilanti, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 293 days.

(21) Appl. No.: 17/682,784

(22) Filed: Feb. 28, 2022

(65) Prior Publication Data

US 2023/0271550 A1    Aug. 31, 2023

(51) Int. Cl.
| | |
|---|---|
| *G08G 1/00* | (2006.01) |
| *B60Q 9/00* | (2006.01) |
| *B62D 1/06* | (2006.01) |
| *G08B 6/00* | (2006.01) |

(52) U.S. Cl.
CPC .............. *B60Q 9/008* (2013.01); *B62D 1/06* (2013.01); *G08B 6/00* (2013.01)

(58) Field of Classification Search
CPC .......... B60Q 9/008; B62D 1/06; B62D 1/046; G08B 6/00
See application file for complete search history.

(56) References Cited

U.S. PATENT DOCUMENTS

| | | | |
|---|---|---|---|
| 7,679,611 | B2 | 3/2010 | Schena |
| 7,714,701 | B2 | 5/2010 | Altan et al. |
| 8,063,754 | B2 | 11/2011 | Tanida et al. |
| 9,188,223 | B1 * | 11/2015 | Seagraves ............... F16H 63/42 |
| 9,278,705 | B2 | 3/2016 | Murata et al. |
| 9,738,220 | B2 * | 8/2017 | Borghi .................... B60Q 5/003 |
| 2006/0162485 | A1 | 7/2006 | Leng et al. |
| 2012/0242465 | A1 * | 9/2012 | Murata .............. G01C 21/3664 |
| | | | 340/407.2 |
| 2015/0197283 | A1 * | 7/2015 | Marti ................. G01C 21/3652 |
| | | | 701/41 |
| 2015/0198448 | A1 * | 7/2015 | Sanma ................... B62D 1/046 |
| | | | 701/400 |

FOREIGN PATENT DOCUMENTS

| | | |
|---|---|---|
| JP | 2003300468 A | 10/2003 |
| JP | 5770544 B2 | 8/2015 |
| KR | 101138820 B1 | 5/2012 |
| WO | 2018168843 A1 | 9/2018 |

* cited by examiner

*Primary Examiner* — Toan N Pham
(74) *Attorney, Agent, or Firm* — DINSMORE & SHOHL LLP

(57) ABSTRACT

A steering wheel assembly for a vehicle, the steering wheel assembly including a steering wheel frame and a tactile notification device coupled to the steering wheel frame. The tactile notification device includes a mounting frame, a first set of disks arranged around and coupled to the first mounting frame, and an actuator operatively coupled to the first set of disks. The actuator is configured to rotate the set of disks.

20 Claims, 4 Drawing Sheets

STEERING WHEEL ASSEMBLIES HAVING TACTILE FEEDBACK DEVICES

TECHNICAL FIELD

The present specification generally relates to steering wheel assemblies and, more specifically, steering wheel assemblies having tactile feedback devices for providing an alert to a driver.

BACKGROUND

It is known to provide a driver of a vehicle with an alert to alert the driver to a specific condition. These alerts can be provided through various manners, such as audio, visuals, and tactile feedback. Tactile alerts are traditionally provided through vibration of a vehicle component in contact with the driver. However, the driver cannot determine additional information from a single tactile alert, such as where the condition is located relative to the vehicle.

Accordingly, a need exists for alternative steering wheel assemblies for providing an alert to a driver.

SUMMARY

In one embodiment, a steering wheel assembly for a vehicle, the steering wheel assembly including a steering wheel frame and a tactile notification device coupled to the steering wheel frame. The tactile notification device includes a mounting frame, a first set of disks arranged around and coupled to the first mounting frame, and an actuator operatively coupled to the first set of disks. The actuator is configured to rotate the set of disks.

In another embodiment, a steering wheel assembly for a vehicle, the steering wheel assembly including a steering wheel frame, and a tactile notification device coupled to the steering wheel frame. The tactile notification device includes a mounting frame, a set of disks arranged around and coupled to the mounting frame, and an actuator operatively coupled to the mounting frame, the actuator configured to compress the set of disks to expand the set of disks radially outward from the mounting frame.

In yet another embodiment, a method of providing a notification using a steering wheel assembly for a vehicle, the method including detecting an alert, and actuating an actuator of a tactile notification device. The alert is related to safety, including one of obstacle detection, advanced driver assistance, a precollision warning, and a blindspot warning. The tactile notification device includes a mounting frame, a set of disks arranged around and coupled to the mounting frame, and the actuator operatively coupled to the mounting frame. The actuator is configured to rotate the set of disks.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figures 1, 2, 3:
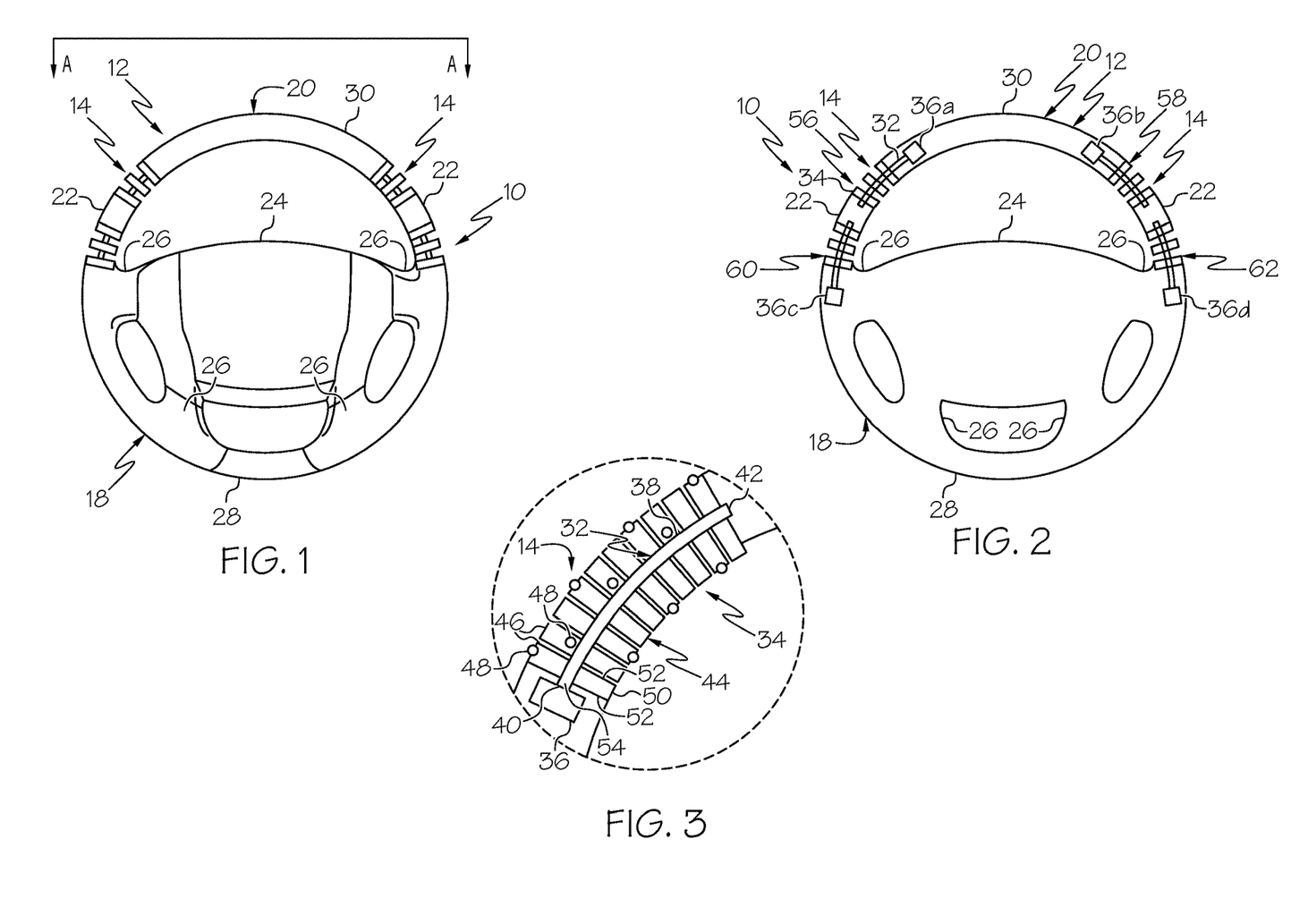
FIG. 1 schematically depicts a front view of a steering wheel assembly according to one or more embodiments shown and described herein.
FIG. 2 schematically depicts a cross sectional front view of the steering wheel assembly of FIG. 1 taken along lines A-A, according to one or more embodiments shown and described herein.
FIG. 3 schematically depicts a partial cross sectional view of a tactile feedback device of the steering wheel assembly of FIG. 1, according to one or more embodiments shown and described herein.

FIG. 1 generally depicts one embodiment of a steering wheel assembly that generally comprises a steering wheel frame, a plurality of tactile notification devices for providing tactile alerts to a driver, and a controller. Each of the plurality of tactile notification devices may be coupled to the steering wheel frame, and each may include a mounting frame, a set of disks arranged around and coupled to the mounting frame, and an actuator operatively coupled to the mounting frame. The actuator may be configured to rotate the set of disks. The tactile notification devices may be arranged around the steering wheel frame. The controller may control operation of the actuators, and actuate specific actuators depending on the location of the condition that triggers the alert to notify the driver of the location of the condition. Various embodiments of the steering wheel assembly and the operation of the steering wheel assembly will be described in more detail herein.

Referring now to FIG. 1, a steering wheel assembly 10 is depicted. As depicted, the steering wheel assembly 10 is a hoop shape for a vehicle 1, such as a passenger vehicle. However, the steering wheel assembly 10 may be any steering control for operating a vehicle 1, including land vehicles, watercraft, aircraft, and spacecraft. The steering wheel assembly 10 may be any operable shape for controlling a vehicle, such as, for example, a square hoop, a yoke, handlebars, a joystick, or the like.

Figure 5:
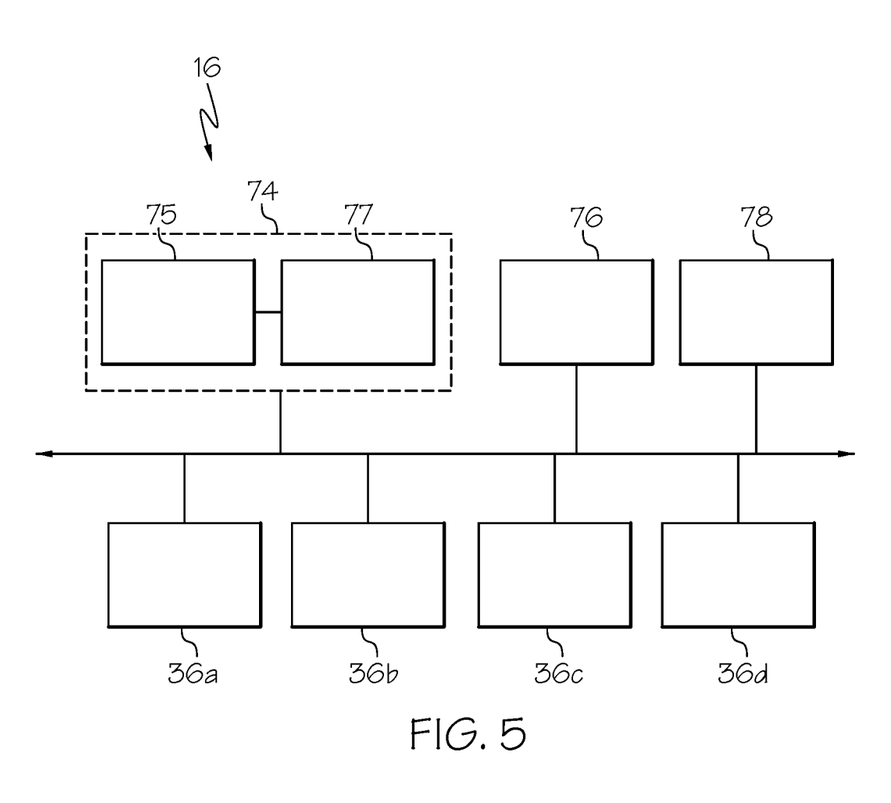
FIG. 5 schematically depicts a control system for controlling operation of a steering wheel assembly, according to one or more embodiments shown and described herein.

Referring to FIG. 2, the steering wheel assembly 10 may include a steering wheel frame 12, a plurality of tactile notification devices 14, and a control system 16 (FIG. 5). The steering wheel frame 12 may include a first section 18, a second section 20, and a pair of intermediate sections 22. The second section 20 may be spaced apart from the first section 18. The pair of intermediate sections 22 may be spaced apart from and positioned between the first section 18 and the second section 20. The first section 18, the second section 20, and the pair of intermediate sections 22 may be arranged to form a hoop shape, such as for a traditional passenger vehicle steering wheel. The first section 18 may include a hub 24, a plurality of spokes 26, and a first wheel portion 28. The plurality of spokes 26 may extend from the hub 24 to the first wheel portion 28. The first wheel portion 28 may be configured to be gripped by a driver. The second section 20 may include a second wheel portion 30. The first wheel portion 28 of the first section 18, the second wheel portion 30 of the second section 20, and the pair of intermediate sections 22 may at least partially define the hoop shape.

Referring to FIGS. 2 and 3, the plurality of tactile notification devices may each include a mounting frame 32, a set of disks 34, and an actuator 36. The set of disks 34 may be arranged around and coupled to the mounting frame 32 such that rotation of the mounting frame 32 rotates the set of disks 34. The actuator 36 may be operatively coupled to the mounting frame 32. The actuator 36 may be configured to rotate the mounting frame 32 and the set of disks 34. The actuator 36 may be any actuator 36 capable of rotating the mounting frame 32 and/or the set of disks 34, such as, for example, a rotary actuator. In embodiments, the actuator 36 may be directly coupled to the set of disks 34 with the set of disks 34 rotatably coupled to the mounting frame 32 such that the actuator 36 is configured to rotate the set of disks 34 about the mounting frame 32.

The mounting frame 32 may include an elongated body 38 having a first end 40 and an opposite second end 42. The first end 40 of the mounting frame 32 may be operatively coupled to the actuator 36 such that actuation of the actuator 36 rotates the mounting frame 32. The second end 42 of the mounting frame 32 may be rotatably coupled to one of the pair of intermediate sections 22 of the steering wheel frame 12 such that the mounting frame 32 may rotate relative to the one of the pair of intermediate sections 22. The mounting frame 32 may have a curved shape extending with the hoop shape of the steering wheel frame 12. The mounting frame 32 may be formed of a material capable of rotating while maintaining the curved shape such as, for example, a metal wire.

The set of disks 34 may include a plurality of disks 44 that may include a body 46 and a nodule 48 coupled to the body 46. The body 46 may include any operable cross-sectional shape for forming a grippable portion of a steering wheel, such as, for example, a cylinder, a triangle, a rectangle, or the like. The body 46 may include an outer surface 50, and a pair of opposing surfaces 52. The outer surface 50 may extend between the pair of opposing surfaces 52. The outer surface 50 may extend perpendicularly to the pair of opposing surfaces 52. The outer surface 50 may be configured to be gripped by the driver. The nodule 48 may be fixedly coupled to the outer surface 50 of the body 46. The nodule 48 may be sized and shaped such that the driver may perceive a difference in tactile feedback from the outer surface 50 of the body 46 and the nodule 48. The nodule 48 may include any operable shape for providing a tactile response to the driver including, for example, a hemisphere, a cone, a cube, or the like. The nodule 48 may provide a greater tactile response than a tactile response from contact between the outer surface 50 and a hand of the driver.

The mounting frame 32 may extend through the pair of opposing surfaces 52 of each of the disks 34 to couple the set of disks 34 to the mounting frame 32. The body 46 of the set of disks 34 may be concentrically arranged around the mounting frame 32 such that the mounting frame 32 extends through a center 54 of the pair of opposing surfaces 52 of the disks 34. The outer surface 50 may be positioned to be concentric with the mounting frame 32. Each disk of the set of disks 34 may be arranged such that the nodule 48 of each disk is angularly offset from the nodule 48 of adjacent disks 34 of the set of disks 34. In embodiments, the disks 34 may be arranged such that the nodules are angularly offset from only one of the nodules 48 of the adjacent disks 34. In further embodiments, the nodules 48 may not be angularly offset from adjacent nodules.

Referring still to FIG. 2, the plurality of tactile notification devices 14 may be coupled to the steering wheel frame 12. The plurality of tactile notification devices 14 may be positioned between and coupled to combinations of the first wheel portion 18, the second wheel portion 20, and one of the pair of intermediate sections 22. The plurality of tactile notification devices 14 may include any operable number of tactile notification devices, such as one, two, three, four, or more than four. The plurality of tactile notification devices 14 may include a first tactile notification device 56, a second tactile notification device 58, a third tactile notification device 60, and a fourth tactile notification device 62.

The first tactile notification device 56 of the plurality of tactile notification devices may be positioned between the second section 20 and one of the pair of intermediate sections 22. The first tactile notification device 56 may include a first actuator 36a positioned within the second section 20 of the steering wheel frame 12. The second end 42 of the mounting frame 32 of the first tactile notification device 56 may be rotatably coupled to the one of the pair of intermediate sections 22.

The second tactile notification device 58 of the plurality of tactile notification devices may be positioned between the second section 20 and the other of the pair of intermediate sections 22. The second tactile notification device 58 may include a second actuator 36b positioned within the second section 20 of the steering wheel frame 12. The second end 42 of the mounting frame 32 of the second tactile notification device 58 may be rotatably coupled to the other of the pair of intermediate sections 22.

The third tactile notification device 60 of the plurality of tactile notification devices may be positioned between the first section 18 and the one of the pair of intermediate sections 22. The third tactile notification device 60 may include a third actuator 36c positioned within the first section 18 of the steering wheel frame 12. The second end 42 of the mounting frame 32 of the third tactile notification device 60 may be rotatably coupled to the one of the pair of intermediate sections 22 with the one of the pair of intermediate sections 22 positioned between the first tactile notification device 56 and the third tactile notification device 60.

The fourth tactile notification device 62 of the plurality of tactile notification devices may be positioned between the first section 18 and the other of the pair of intermediate sections 22. The fourth tactile notification device 62 may include a fourth actuator 36d positioned within the first section 18 of the steering wheel frame 12. The second end 42 of the mounting frame 32 of the fourth tactile notification device 62 may be rotatably coupled to the other of the pair of intermediate sections 22 with the other of the pair of intermediate sections 22 positioned between the second tactile notification device 58 and the fourth tactile notification device 62.

The first tactile notification device 56 and the third tactile notification device 60 may be positioned on a left side of the steering wheel assembly 10 such that the first tactile notification device 56 and the third tactile notification device 60 are gripped by a left hand of the driver. The second tactile notification device 58 and the fourth tactile notification device 62 may be positioned on a right side opposite the left side of the steering wheel assembly 10 such that the second tactile notification device 58 and the fourth tactile notification device 62 are gripped by a right hand of the driver.

Figure 4:
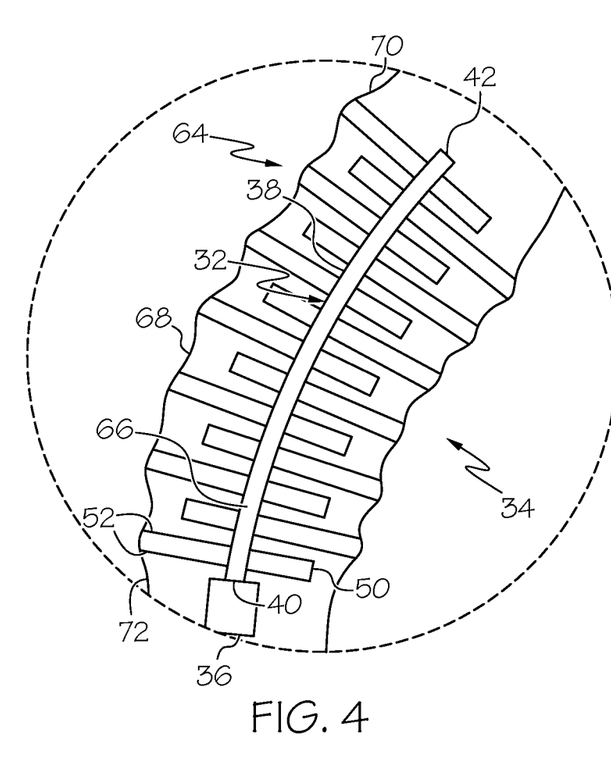
FIG. 4 schematically depicts a partial cross sectional view of another tactile feedback device of the steering wheel assembly of FIG. 1, according to one or more embodiments shown and described herein.

Referring briefly to FIG. 4, an alternative tactile notification device 64 is depicted. The alternative tactile notification device 64 is substantially similar to that of the tactile notification devices 14 described above, in which like numbers will be used to refer to like structure of the tactile notification devices 14. The plurality of disks 34 of the alternative tactile notification device 64 may be eccentrically arranged around the mounting frame 32 such that each disk of the set of disks 34 is angularly offset from adjacent disks 34 of the set of disks 34. The mounting frame 32 may extend through the pair of opposing surfaces 52 at a portion 66 spaced apart from the center 54 of the pair of opposing surfaces 52. The plurality of disks 34 may be angularly offset such that the outer surface 50 of each of the disks 34 are not concentric with at least one of the outer surfaces of the adjacent disks 34. The alternative tactile notification device 64 may further include a sleeve 68 that extends over the set of disks 34. The sleeve 68 may include a first end 70 and an opposite second end 72, the first end 40 being coupled to one of the first section 18, the second section 20, and one of the intermediate sections 22 of the steering wheel frame 12, and the second end 42 being coupled to another of the first section 18, the second section 20, and one of the intermediate sections 22 to extend over the set of disks 34. The rotation of the set of disks 34 may deform the sleeve 68 such that the driver may receive tactile feedback from the eccentric rotation of the set of disks 34 through the sleeve 68.

Referring to FIG. 5, the control system 16 may include a controller 74, one or more position sensors 76, and one or more external vehicle sensors 78. The controller 74 includes a processor 75 and a non-transitory electronic memory 77 to which various components are communicatively coupled. In some embodiments, the processor 75 and the non-transitory electronic memory 77 and/or the other components are included within a single device. In other embodiments, the processor 75 and the non-transitory electronic memory 77 and/or the other components may be distributed among multiple devices that are communicatively coupled. The controller includes non-transitory electronic memory 77 that stores a set of machine-readable instructions. The processor 75 executes the machine-readable instructions stored in the non-transitory electronic memory 77. The non-transitory electronic memory 77 may comprise RAM, ROM, flash memories, hard drives, or any device capable of storing machine-readable instructions such that the machine-readable instructions can be accessed by the processor 75. Accordingly, the control system 16 described herein may be implemented in any conventional computer programming language, as pre-programmed hardware elements, or as a combination of hardware and software components. The non-transitory electronic memory 77 may be implemented as one memory module or a plurality of memory modules.

The processor 75 may be any device capable of executing machine-readable instructions. For example, the processor 75 may be an integrated circuit, a microchip, a computer, or any other computing device. The non-transitory electronic memory 77 and the processor 75 are coupled to the communication path that provides signal interconnectivity between various components and/or modules of the actuation system. Accordingly, the communication path may communicatively couple any number of processors with one another, and allow the modules coupled to the communication path to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 5, the communication path communicatively couples the processor 75 and the non-transitory electronic memory 77 of the controller 74 with a plurality of other components of the control system 16. For example, the control system 16 depicted in FIG. 5 includes the processor 75 and the non-transitory electronic memory 77 communicatively coupled with the first actuator 36a of the first tactile notification device 56, the second actuator 36b of the second tactile notification device 58, the third actuator 36c of the third tactile notification device 60, the fourth actuator 36d of the fourth tactile notification device 62, the position sensors 76, and the external vehicle sensors 78. The controller 74 may be configured to actuate each of the actuators of the tactile notification devices 14 when the controller 74 detects an alert based on the signals received from the external vehicle sensors 78.

The external vehicle sensors 78 may be in communication with the controller 74 such that the external vehicle sensors 78 may send signals to the controller 74 indicative of conditions around the vehicle 1, and a location of the conditions. The controller 74 may determine an alert and the location of the alert based on the detected conditions received from the external vehicle sensors 78. The alert may be related to safety, and may include, for example, one or more of obstacle detection, advanced driver assistance, a precollision warning, a blindspot warning, or the like. By way of example, the external vehicle sensors 78 may send a signal to the controller 74 indicative of another vehicle being positioned in a blindspot on a left side of the vehicle 1. The left side of the vehicle 1 may be a left of the driver facing in a vehicle forward direction.

The external vehicle sensors 78 may be configured to send a signal to the controller 74 indicative of the alert related to the vehicle 1, along with the position of the alert relative to the vehicle 1. The controller 74 may actuate the actuators of the first tactile notification device 56, the second tactile notification device 58, the third tactile notification device 60, and the fourth tactile notification device 62 depending on the detected location of the alert. When the location of the alert is forward of the vehicle 1, the controller 74 may actuate the first actuator 36a of the first tactile notification device 56 and the second actuator 36b of the second tactile notification device 58 to alert the driver to a front of the vehicle 1. When the location of the alert is rearward of the vehicle 1, the controller 74 may actuate the third actuator 36c of the third tactile notification device 60 and the fourth actuator 36d of the fourth tactile notification device 62 to alert the driver to a rear of the vehicle 1. When the location of the alert is to a left of the vehicle 1, the controller 74 may actuate one or both of the first actuator 36a of the first tactile notification device 56 and the third actuator 36c of the third tactile notification device 60 to alert the driver to the left of the vehicle 1. When the location of the alert is to a right of the vehicle 1, the controller 74 may actuate one or both of the second actuator 36b of the second tactile notification device 58 and the fourth actuator 36d of the fourth tactile notification device 62 to alert the driver to the right of the vehicle 1. When the actuators are actuated, the set of disks 34 of the respective actuated tactile feedback devices may rotate, thereby providing tactile feedback to the driver through contact of the rotating disks 34 and the nodules 48 with the driver's hands. The tactile feedback of the specified tactile feedback devices may indicate to the driver that an alert has been detected and the location of that alert.

The position sensors 76 may be configured to detect a hand position of the driver relative to the steering wheel assembly 10. The position sensors 76 may detect whether the hand position is on one of the first tactile notification device 56, the second tactile notification device 58, the third tactile notification device 60, and the fourth tactile notification device 62. The position sensors 76 may be any sensor capable of detecting the hand position of the driver, for example, a force sensor, a camera, an infrared sensor, or the like. The position sensors 76 may be configured to send a signal to the controller 74 indicative of the hand position of the driver. The controller 74 may actuate, in response to detecting an alert, the actuators of the tactile feedback devices that the hand position is positioned over. For example, when the controller 74 detects that the hand position is on the first tactile feedback device 56, the controller 74 may actuate the first actuator 36a of the first tactile feedback device 56 when an alert is detected.

Figure 6:
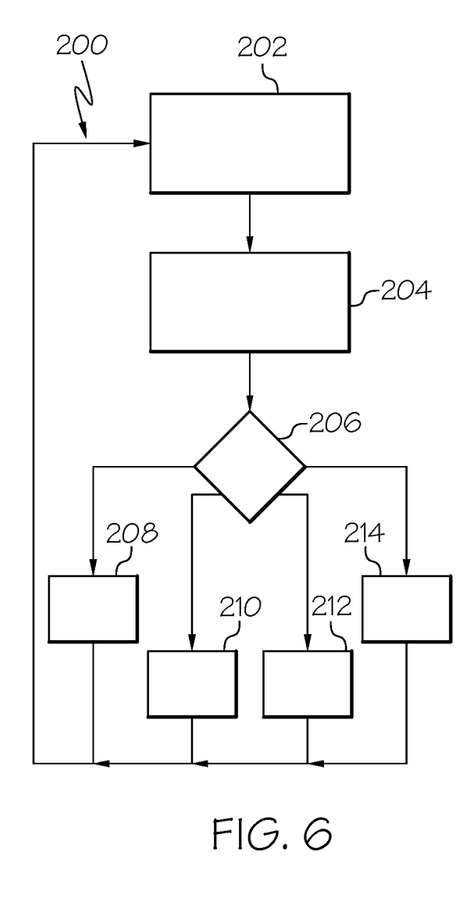
FIG. 6 depicts a flow chart of operation of a steering wheel assembly, according to one or more embodiments shown and described herein.

Referring to FIG. 6, a flow chart of a method 200 of operation of the steering wheel assembly 10 is depicted. At step 202, the method 200 includes detecting the alert related to safety, including one of obstacle detection, advanced driver assistance, a precollision warning, a blindspot warning, or the like. At step 204, the method 200 includes detecting a hand position of the driver. The hand position may be on one or more of the first tactile notification device 56, the second tactile notification device 58, the third tactile notification device 60, and the fourth tactile notification device 62. At step 206, the method 200 includes determining a location of the alert relative to the vehicle 1, the location being one of a front side of the vehicle 1, a left side of the vehicle 1, a right side of the vehicle 1, and a rear side of the vehicle 1.

At step 208, the method 200 includes actuating the first actuator 36a of the first tactile notification device 56 and the second actuator 36b of the second tactile notification device 58 when the location of the alert is on the front side of the vehicle 1. At step 210, the method 200 includes actuating the first actuator 36a of the first tactile notification device 56 and the third actuator 36c of the third tactile notification device 60 when the location of the alert is on the left side of the vehicle 1. At step 212, the method 200 includes actuating the second actuator 36b of the second tactile notification device 58 and the fourth actuator 36d of the fourth tactile notification device 62 when the location of the alert is on the right side of the vehicle 1. At step 214, the method 200 includes actuating the third actuator 36c of the third tactile notification device 60 and the fourth actuator 36d of the fourth tactile notification device 62 when the location of the alert is on the rear side of the vehicle 1.

Figure 7:
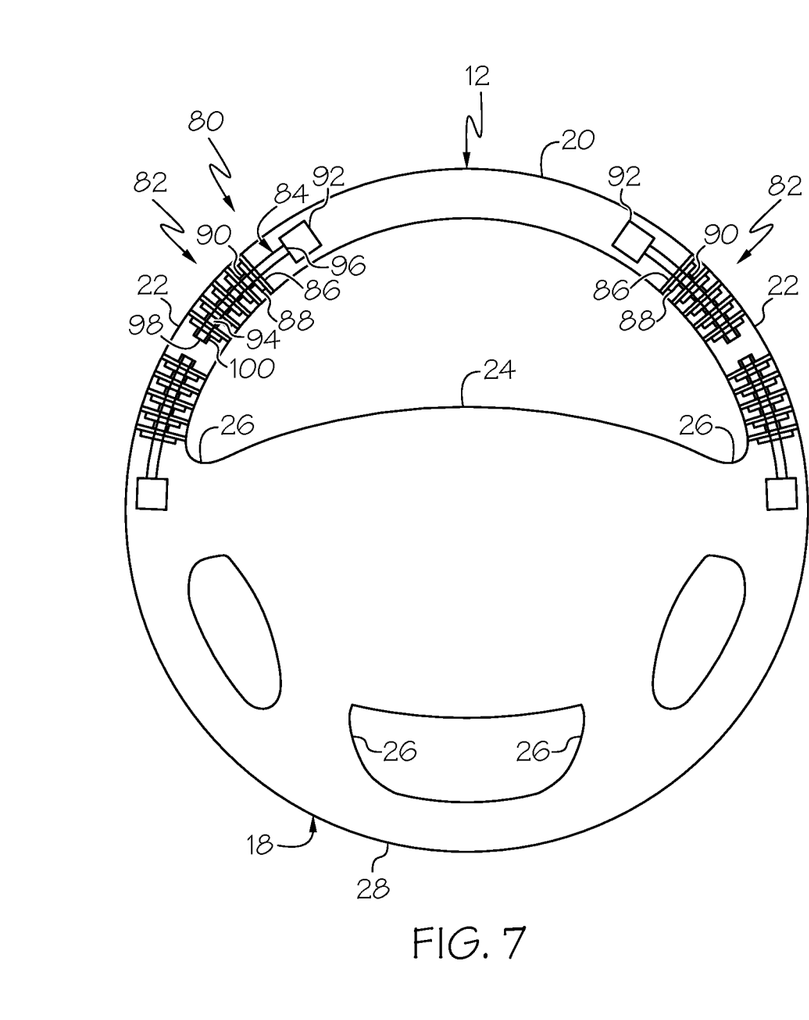
FIG. 7 schematically depicts a cross sectional view of another steering wheel assembly having a plurality of tactile feedback devices, according to one or more embodiments shown and described herein.
Figure 8:
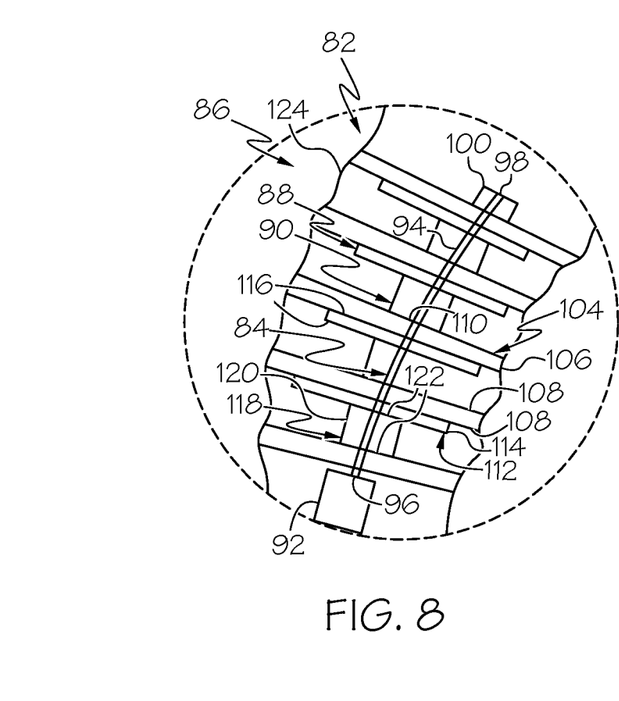
FIG. 8 schematically depicts a partial cross sectional view of one of the tacile feedback devices of FIG. 7, according to one or more embodiments shown and described herein.

Referring now to FIGS. 7 and 8, an alternative steering wheel assembly 80 is depicted. The alternative steering wheel assembly 80 is substantially similar to that of the steering wheel assembly 10 described above, in which like numbers will be used to refer to like structure of the steering wheel assembly. The alternative steering wheel assembly 80 may include a plurality of tactile notification devices 82 coupled to and arranged about the steering wheel frame 12 similarly to that of the steering wheel assembly 10 described above, and may further include a sleeve 124 that extends over the plurality of tactile notification devices 82. The plurality of tactile notification devices 82 may each include a mounting frame 84, a set of disks 86, a first set of spacers 88, a second set of spacers 90, and an actuator 92. Each of the set of disks 86, the first set of spacers 88, and the second set of spacers 90 may be arranged around and coupled to the mounting frame 84. The actuator 92 may be operatively coupled to the mounting frame 84. The actuator 92 may be configured to move the mounting frame 84 linearly toward and away from the actuator 92. The actuator 92 may be any actuator capable of linearly displacing the mounting frame 84, such as, for example, a linear actuator. In embodiments, the actuator 92 may be directly coupled to the set of disks 86 with the set of disks 86 movably coupled to the mounting frame 84 such that the actuator 92 is configured to linearly displace the set of disks 86 along a length of the mounting frame 84. In embodiments, the tactile notification device 82 may include only one of the first set of spacers 88 and the second set of spacers 90. In embodiments, the tactile notification device 82 may not include spacers.

The mounting frame 84 may include an elongated body 94 having a first end 96, an opposite second end 98, and a backstop 100. The first end 96 of the mounting frame 84 may be operatively coupled to the actuator 92 such that actuation of the actuator 92 linearly displaces the mounting frame 84. The second end 98 of the mounting frame 84 may be fixedly coupled to the backstop 100. The backstop 100 may include a thickness that is greater than a thickness of the mounting frame 84, such that the backstop 100 may contact one of the set of disks 86, the first set of spacers 88, and the second set of spacers 90. The backstop 100 may maintain the set of disks 86, the first set of spacers 88, and the second set of spacers 90 on the elongated body 94 of the mounting frame 84. The mounting frame 84 may have a curved shape extending with the hoop shape of the steering wheel frame.

The set of disks 86 may include a plurality of disks 86 that may each include a body 104. The body 104 may be formed of a compressible material such that axial compression on the body 104 causes the body 104 to displace radially outward. For example, the body 104 of each of the disks 86 of the set of disks 86 may be formed of rubber, foam, plastic, or the like. The body 104 may include a cylindrical shape. The body 104 may include an outer surface 106, and a pair of opposing surfaces 108. The outer surface 106 may extend between the pair of opposing surfaces 108. The outer surface 106 may extend perpendicularly to the pair of opposing surfaces 108. The outer surface 106 may be configured to be gripped by the driver. The set of disks 86 may include any operable number of disks 86, such as one, two, three, four, five, or more than five.

The mounting frame 84 may extend through a center 110 of the pair of opposing surfaces 108 of each of the disks 86 of the set of disks 86. The disks 86 of the set of disks 86 may be arranged around and coupled to the mounting frame 84. The disks 86 of the set of disks 86 may be arranged concentrically with the mounting frame 84. The disks 86 may be fixedly coupled to the mounting frame 84 such that linear movement of the mounting frame 84 moves the disks 86 linearly. In embodiments, the disks 86 may be movably coupled to the mounting frame 84 such that the mounting frame 84 may move linearly with respect to the set of disks 86. The backstop 100 may contact one of the pair of opposing surfaces 108 of a disk positioned distal from the actuator 92.

The spacers 88 of the first set of spacers 88 may each include a body 112. The body 104 may include an outer surface 114 defining the periphery of the body 104, and a pair of opposing surfaces 116. The outer surface 106 may extend between the pair of opposing surfaces 108 of each spacer of the first set of spacers 88. The outer surface 106 may extend perpendicularly to the pair of opposing surfaces 108 of each spacer of the first set of spacers 88. The body 104 may have a rounded shape, such as a circle, oval, or the like. The body 104 of the spacers 88 of the first set of spacers 88 may be shaped similarly to the disks 86 of the set of disks 86. A thickness of each spacer of the first set of spacers 88 may be defined by a distance from one side of the outer surface 106 to an opposite side of the outer surface 106. In embodiments where the body 104 has a circle shape, the thickness is the radius of the body 104. The thickness of each spacer of the first set of spacers 88 may be equal to or less than the thickness of each disk of the set of disks 86.

The spacers 88 of the first set of spacers 88 may be formed of a material with a lower compressibility than the set of disks 86 such that compression between the first set of spacers 88 and the set of disks 86 causes the disks 86 to expand. The first set of spacers 88 may include any operable number of spacers 88, such as one, two, three, four, five, or more than five. The first set of spacers 88 may include a number of spacers 88 equal to the number of disks 86 of the set of disks 86.

The spacers 88 of the first set of spacers 88 may be arranged around and coupled to the mounting frame 84. The spacers 88 may be arranged concentrically with the mounting frame 84 and/or the disks 86 of the set of disks 86. The spacers 88 may be fixedly coupled to the mounting frame 84 such that linear movement of the mounting frame 84 moves the spacers 88 linearly. In embodiments, the spacers 88 may be movably coupled to the mounting frame 84 such that the mounting frame 84 may move linearly with respect to the first set of spacers 88. Each spacer of the first set of spacers 88 may be positioned between a pair of adjacent disks 86 of the set of disks 86. One of the pair of opposing surfaces 108 of each spacer of the first set of spacers 88 may contact one of the pair of opposing surfaces 108 of an adjacent disk.

The spacers 90 of the second set of spacers 90 may each include a body 118. The body 118 may include an outer surface 120 defining the periphery of the body 118, and a pair of opposing surfaces 122. The outer surface 106 may extend between the pair of opposing surfaces 108 of each spacer of the second set of spacers 90. The outer surface 106 may extend perpendicularly to the pair of opposing surfaces 108 of each spacer of the second set of spacers 90. The body 118 may have a rounded shape, such as a circle, oval, or the like. The body 118 of the spacers 90 of the second set of spacers 90 may be shaped similarly to the disks 86 of the set of disks 86 and/or the spacers 88 of the first set of spacers 88. In embodiments, each of the disks 86, the first set of spacers 88, and the second set of spacers 90 may include separate shapes. A thickness of each spacer of the second set of spacers 90 may be defined by a distance from one side of the outer surface 106 to an opposite side of the outer surface 106. In embodiments where the body 118 has a circle shape, the thickness is the radius of the body 118. The thickness of the spacers of the second set of spacers 90 may be less than the thickness of the spacers of the first set of spacers 88.

The spacers 90 of the second set of spacers 90 may be arranged around and coupled to the mounting frame 84. The second set of spacers 90 may be arranged concentrically with the mounting frame 84, the set of disks 86, the first set of spacers 88, or any combination thereof. The spacers 90 may be fixedly coupled to the mounting frame 84 such that linear movement of the mounting frame 84 moves the spacers 90 linearly. In embodiments, the spacers 90 may be movably coupled to the mounting frame 84 such that the mounting frame 84 may move linearly with respect to the second set of spacers 90. Each spacer of the second set of spacers 90 may be positioned between one of the spacers 88 of the first set of spacers 88 and one of the disks 86 of the set of disks 86. The set of disks 86, the first set of spacers 88, and the second set of spacers 90 may be stacked in any order relative to one another, with the disks 86, the first set of spacers 88, and the second set of spacers 90 being stacked in an alternating configuration. Each of the set of disks 86, the first set of spacers 88, and the second set of spacers 90 may be stacked in the order of one disk of the set of disks 86, one spacer of the first set of spacers 88, and one spacer of the second set of spacers 90. One of the pair of opposing surfaces 108 of each spacer of the second set of spacers 90 may contact one of the pair of opposing surfaces 108 of an adjacent spacer of the first set of spacers 88. The other of the pair of opposing surfaces 108 of each spacer of the second set of spacers 90 may contact the other of the pair of opposing surfaces 108 of an adjacent disk of the set of disks 86. The sleeve 124 may extend around and conform to the shape of the stacked disks 86, the first set of spacers 88, and the second set of spacers 90. The sleeve 124 may be formed in a monolithic, one-piece structure with the wrapping of the steering wheel assembly 10, and may be formed of leather, cloth, or the like.

Actuation of the actuator 92 may move the mounting frame 84 toward the actuator 92. The movement of the mounting frame 84 compresses the disks 86 through contact between the backstop 100 of the mounting frame 84 and the one of the pair of opposing surfaces 108 of the distalmost disk. The first set of disks 86 act to add additional compression on the disks 86 through contact with one of the pair of opposing surfaces 108 of the disks 86. The second set of spacers 90 may have a larger radius than the first set of spacers 88, such that the second set of spacers 90 shape the compression of the set of disks 86. The second set of spacers 90 may reduce the expansion of the disks 86 in an axial direction of the body 104 of the disks 86, thereby increasing the expansion of the disks 86 in the radial direction of the body 104 of the disks 86. The actuator 92 may be actuated in a pulsing manner, actuating and ceasing actuation over a period of time.

When compressed, the disks 86 may expand radially outward to deform the sleeve 124, such that a driver may detect tactile feedback from the disks 86 through the sleeve 124. The actuator 92 may be actuated to compress the disks 86 to form an ergonomic grip. Specifically, the sleeve 124 may deform outward at locations that are in contact with the expanded disks 86, forming channels between the disks 86. The channels may be configured to receive portions of the driver's hand in an ergonomic manner. The steering wheel assembly 80 may be communicatively coupled in a manner similarly to the steering wheel assembly 10, such that the controller 74 controls operation of the actuators 92. The controller 74 may detect a hand position of the driver via signals received from the position sensors 76. The controller 74 may then operate the actuator 92 of the respective tactile notification device 82 positioned under the driver's hand to form the ergonomic grip where the driver is gripping the steering wheel assembly 80.

It should now be understood that a steering wheel assembly for providing tactile alerts to a driver is provided. The steering wheel assembly includes a plurality of tactile notification devices each having a plurality of disks and an actuator that drives the disks to provide a tactile response to the driver. The steering wheel assembly may selectively drive the actuators of each of the tactile notification devices to alert the driver to a location of the alert relative to the vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A steering wheel assembly for a vehicle, the steering wheel assembly comprising:
   a steering wheel frame;
   a first tactile notification device coupled to the steering wheel frame, the first tactile notification device comprising:
      a first mounting frame;
      a first set of disks arranged around and coupled to the first mounting frame; and
      a first actuator operatively coupled to the first set of disks, the first actuator configured to rotate the first set of disks.

2. The steering wheel assembly of claim 1, wherein:
   the first set of disks are concentrically arranged around the first mounting frame, and
   each disk of the first set of disks comprise:
      a body comprising an outer surface, the body concentrically arranged on the first mounting frame; and
      a nodule coupled to the outer surface of the body.

3. The steering wheel assembly of claim 2, wherein:
   each nodule is angularly offset from the nodule of an adjacent disk of the first set of disks.

4. The steering wheel assembly of claim 1, wherein:
   the first set of disks is eccentrically arranged around the first mounting frame; and
   each disk of the first set of disks is angularly offset from an adjacent disk of the first set of disks.

5. The steering wheel assembly of claim 1, further comprising:
   a controller communicatively coupled to the first actuator, the controller configured to actuate the first actuator to rotate the first set of disks when the controller detects an alert.

6. The steering wheel assembly of claim 5, further comprising:
   a second tactile notification device coupled to the steering wheel frame, the second tactile notification device comprising:
      a second mounting frame;
      a second set of disks arranged around and coupled to the second mounting frame; and
      a second actuator operatively coupled to the second mounting frame, the second actuator configured to rotate the second mounting frame and the second set of disks.

7. The steering wheel assembly of claim 6, wherein:
   the controller determines a location of the alert relative to the vehicle, the location including a front of the vehicle, a left side of the vehicle, a right side of the vehicle, or a rear of the vehicle,
   the controller actuates the first actuator when the location of the alert is one of the front of the vehicle, the left side of the vehicle, the right side of the vehicle, and the rear of the vehicle, and
   the controller actuates the second actuator when the location of the alert is another of the front of the vehicle, the left side of the vehicle, the right side of the vehicle, and the rear of the vehicle.

8. The steering wheel assembly of claim 6, further comprising:
   a third tactile notification device coupled to the steering wheel frame and positioned adjacent the first tactile notification device, the third tactile notification device comprising:
      a third mounting frame;
      a third set of disks arranged around and coupled to the third mounting frame;
      a third actuator operatively coupled to the third mounting frame, the third actuator configured to rotate the third mounting frame and the third set of disks;
   a fourth tactile notification device coupled to the steering wheel frame and positioned adjacent the second tactile notification device, the fourth tactile notification device comprising:
      a fourth mounting frame;
      a fourth set of disks arranged around and coupled to the fourth mounting frame; and
      a fourth actuator operatively coupled to the fourth mounting frame, the fourth actuator configured to rotate the fourth mounting frame and the fourth set of disks,
   wherein the second tactile notification device is spaced apart from the first tactile notification device.

9. The steering wheel assembly of claim 8, wherein:
   the controller determines a location of the alert relative to the vehicle, the location including a front of the vehicle, a left side of the vehicle, a right side of the vehicle, or a rear of the vehicle,
   the controller actuates the first actuator and the second actuator when the location of the alert is the front of the vehicle,
   the controller actuates the first actuator when the location of the alert is the left side of the vehicle;
   the controller actuates the second actuator when the location of the alert is the right side of the vehicle; and
   the controller actuates the third actuator and the fourth actuator when the location of the alert is the rear of the vehicle.

10. The steering wheel assembly of claim 6, wherein the alert is a warning related to safety, including one of obstacle detection, advanced driver assistance, a precollision warning, and a blindspot warning.

11. A steering wheel assembly for a vehicle, the steering wheel assembly comprising:
    a steering wheel frame;
    a first tactile notification device coupled to the steering wheel frame, the first tactile notification device comprising:
       a first mounting frame;
       a first set of disks arranged around and coupled to the first mounting frame; and
       a first actuator operatively coupled to the first mounting frame, the first actuator configured to compress the first set of disks to expand the first set of disks radially outward from the first mounting frame.

12. The steering wheel assembly of claim 11, further comprising a first set of spacers arranged around and coupled to the first mounting frame, each spacer of the first set of spacers is positioned between a pair of adjacent disks of the first set of disks.

13. The steering wheel assembly of claim 12, further comprising a second set of spacers arranged around and coupled to the first mounting frame, each spacer of the second set of spacers is positioned between one of the spacers of the first set of spacers and one of the first set of disks of the first set of disks, wherein the spacers of the first set of spacers includes a first thickness, the spacers of the second set of spacers includes a second thickness, and the second thickness is less than the first thickness.

14. The steering wheel assembly of claim 11, further comprising:

a controller communicatively coupled to the first actuator, the controller configured to actuate the first actuator to compress the first set of disks when the controller detects an alert related to safety, including one of obstacle detection, advanced driver assistance, a pre-collision warning, and a blindspot warning.

15. The steering wheel assembly of claim 14, further comprising:

a second tactile notification device coupled to the steering wheel frame, the second tactile notification device comprising:
    a second mounting frame;
    a second set of disks arranged around and coupled to the second mounting frame; and
    a second actuator operatively coupled to the second mounting frame, the second actuator configured to compress the second set of disks to expand the first set of disks radially outward from the second mounting frame;
a third tactile notification device coupled to the steering wheel frame and positioned adjacent the first tactile notification device, the third tactile notification device comprising:
    a third mounting frame;
    a third set of disks arranged around and coupled to the third mounting frame;
    a third actuator operatively coupled to the third mounting frame, the third actuator configured to compress the third set of disks to expand the first set of disks radially outward from the third mounting frame;
a fourth tactile notification device coupled to the steering wheel frame and positioned adjacent the second tactile notification device, the fourth tactile notification device comprising:
    a fourth mounting frame;
    a fourth set of disks arranged around and coupled to the fourth mounting frame; and
    a fourth actuator operatively coupled to the fourth mounting frame, the fourth actuator configured to compress the fourth set of disks to expand the first set of disks radially outward from the fourth mounting frame,
wherein the second tactile notification device is spaced apart from the first tactile notification device.

16. The steering wheel assembly of claim 15, wherein:
the controller determines a location of the alert relative to the vehicle, the location including a front of the vehicle, a left side of the vehicle, a right side of the vehicle, or a rear of the vehicle,
the controller actuates the first actuator and the second actuator when the location of the alert is the front of the vehicle,
the controller actuates the first actuator when the location of the alert is the left side of the vehicle;
the controller actuates the second actuator when the location of the alert is the right side of the vehicle; and
the controller actuates the third actuator and the fourth actuator when the location of the alert is the rear of the vehicle.

17. The steering wheel assembly of claim 15, further comprising:

a sensor configured to detect a hand position of a driver on one of the first tactile notification device, the second tactile notification device, the third tactile notification device, and the fourth tactile notification device, wherein:
the sensor is communicatively coupled to the controller, and
the controller is configured to activate the first actuator when the hand position is detected on the first tactile notification device.

18. The steering wheel assembly of claim 11, wherein the first actuator compresses the first set of disks to form an ergonomic grip.

19. A method of providing a notification using a steering wheel assembly for a vehicle, the method comprising:

detecting an alert related to safety, including one of obstacle detection, advanced driver assistance, a pre-collision warning, and a blindspot warning;
actuating a first actuator of a first tactile notification device, the first tactile notification device comprising:
    a first mounting frame;
    a first set of disks arranged around and coupled to the first mounting frame; and
    the first actuator operatively coupled to the first mounting frame, the first actuator configured to rotate the first mounting frame and the first set of disks.

20. The method of claim 19, further comprising:

determining a location of the alert relative to the vehicle, the location including a front of the vehicle, a left side of the vehicle, a right side of the vehicle, or a rear of the vehicle;
actuating the first actuator when the location of the alert is one of the front of the vehicle, the left side of the vehicle, the right side of the vehicle, and the rear of the vehicle, and
actuating a second actuator of a second tactile notification device when the location of the alert is another of the front of the vehicle, the left side of the vehicle, the right side of the vehicle, and the rear of the vehicle, the second tactile notification device comprising:
    a second mounting frame;
    a second set of disks arranged around and coupled to the second mounting frame; and
    the second actuator operatively coupled to the second mounting frame, the second actuator configured to rotate the second mounting frame and the second set of disks.

* * * * *